United States Patent [19]

Bertness et al.

[11] Patent Number: 4,877,536
[45] Date of Patent: Oct. 31, 1989

[54] METHOD OF TREATING SALINE WATER

[75] Inventors: Theodore A. Bertness, Whittier; Samuel P. Lipoma, Delano, both of Calif.

[73] Assignee: Bertness Enterprises, Inc., Sioux City, Iowa

[21] Appl. No.: 132,360

[22] Filed: Dec. 14, 1987

Related U.S. Application Data

[63] Continuation of Ser. No. 922,681, Oct. 24, 1986, abandoned, which is a continuation of Ser. No. 434,062, Oct. 13, 1982, abandoned, which is a continuation-in-part of Ser. No. 256,719, Apr. 23, 1981, abandoned.

[51] Int. Cl.$^4$ .................. C02F 1/52; C02F 1/66
[52] U.S. Cl. .................... 210/712; 210/737; 210/747; 166/267; 166/272; 166/303; 203/11
[58] Field of Search ............... 210/712, 737, 747, 748; 203/7, 10, 11, 28, 100, DIG. 13; 166/266, 267, 272, 303; 55/45, 46, 54, 68, 228

[56] References Cited

U.S. PATENT DOCUMENTS

| | | | |
|---|---|---|---|
| 1,059,431 | 4/1913 | Brazda | 55/54 |
| 2,649,408 | 8/1953 | Williamson | 203/7 |
| 2,708,166 | 5/1955 | Tumerman | 210/737 |
| 2,775,555 | 12/1956 | Clarkson | 210/748 |
| 2,789,083 | 4/1957 | Hardy | 210/737 |
| 3,390,078 | 6/1968 | Hatch | 210/737 |
| 3,410,796 | 11/1968 | Hull | 210/737 |
| 3,523,076 | 8/1970 | Goerz | 210/748 |
| 3,583,910 | 6/1971 | Stoddard | 210/737 |
| 3,607,667 | 9/1971 | Knapp | 203/100 |
| 3,707,464 | 12/1972 | Burns | 210/737 |
| 3,731,801 | 5/1973 | Hess | 210/737 |
| 3,951,753 | 4/1976 | Roller | 203/7 |
| 4,247,371 | 1/1981 | Roller | 210/718 |
| 4,398,603 | 8/1983 | Rodwell | 166/267 |

OTHER PUBLICATIONS

Thompson, "Effect of Ultrasonic Energy of Settling of Solids in Phosphate Tailing," Industrial and Engineering Chemistry, vol. 46, No. 6, 1954, p. 1172.
Betz Handbook of Industrial Water Conditioning, Betz, Trevose, Pa. pp. 98-99.
Hawley The Condensed Chemical Dictionary, Eighth Edition, Van Nostrand Reinhold Co. 1971, p. 27.

Primary Examiner—Ernest G. Therkorn
Attorney, Agent, or Firm—Edward B. Gregg

[57] ABSTRACT

Method of treating hard water containing dissolved and/or suspended volatile non-aqueous material, in which the water is heated by direct contact with steam to precipitate the hardness and resulting in three phases, namely, a gas phase comprising steam and vapor of volatile non-aqueous material, a soft water phase and a sludge (precipitate) phase. The gas phase is separated carrying with it the volatile non-aqueous components derived from the feed water. The soft water phase is separated from the sludge. The separated water phase is free or substantially free of volatile non-aqueous material and is suitable for use in a once through steam generator to produce saturated steam. The steam used to heat and strip the feed water is generated outside the process and preferably is steam generated in a conventional steam generator from a portion of the soft water produced in the process. The remainder of the soft water may be used to generate steam, e.g., to inject into an oil field to augment recovery of heavy viscous oil. The method is particularly applicable to brine produced with oil in certain oil fields.

6 Claims, 1 Drawing Sheet

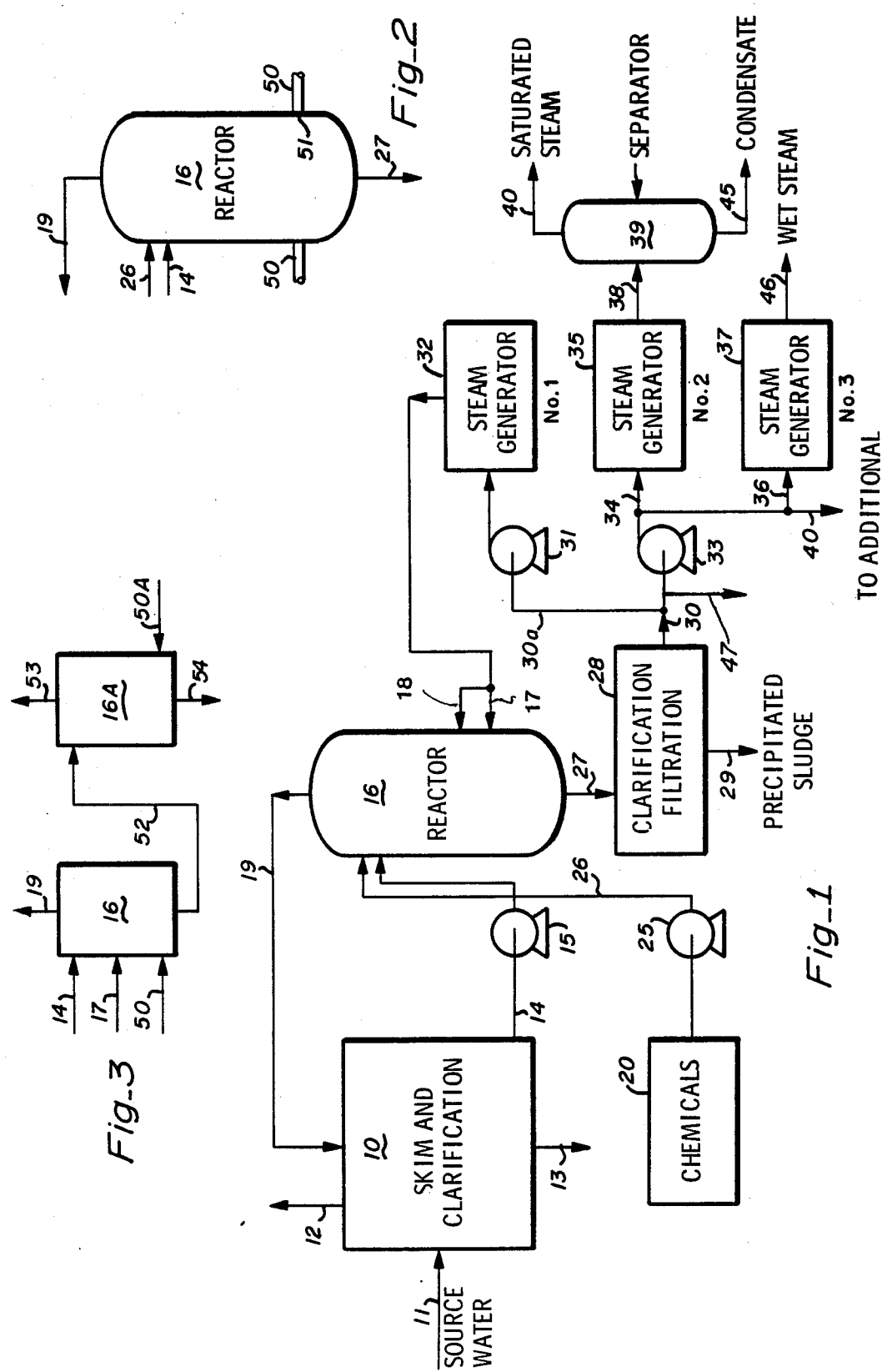

METHOD OF TREATING SALINE WATER

This is a continuation of application Ser. No. 922,681, filed on Oct. 24, 1986, which in turn is a continuation of application Ser. No. 434,062, filed on Oct. 13, 1982, which in turn is a continuation in part of application Ser. No. 256,719, filed on Apr. 23, 1981, all now abandoned.

This invention relates to the treatment of water containing solutes such as calcium and/or magnesium salts which cause what is known as "hardness" and which also contains dissolved and/or suspended volatile non-aqueous material.

A typical area of utilization of the invention is in the treatment of saline water (brine) which is produced along with petroleum in certain areas such as heavy oil fields in California. In such fields a volume of saline water (brine) is produced along with the oil, such volume usually being greater than the volume of oil produced. By law in most areas such brines (hereinafter sometimes referred to as "produced water") must be reinjected into the ground. It is the further practice in such fields to inject steam derived from a fresh water supply supply into the formation to enhance recovery. Such use of steam adds to the volume of water which is injected into the ground such that it is difficult or impossible to continue both steam injection at the desired rate and reinjection of produced water into the same field. The volume of increased oil recovery due to steam injection is approximately 20 to 30 percent of the water which is injected as steam, hence the importance of steam injection. Another method of recovery of viscous oil is the injection of hot water.

This problem has been attacked by heating the produced water to produce steam or hot water which is then injected into the oil field. This avoids augmentation of the volume of water injected into the field because the injected steam or hot water required comes from the produced water. However, the produced water is best described as "dirty"; it is high in saline content and it also contains dissolved and/or suspended volatile non-aqueous material such as oil (dissolved and suspended) and dissolved gases such as hydrocarbon gases, hydrogen sulfide, oxygen and carbon dioxide. If produced water is treated to effect gravity separation it nevertheless contains dissolved material including the hardness components, dissolved gases, and finely divided suspended liquids and/or solids which cannot be separated by gravity unless expensive methods of gravity separation are employed. Such methods will not remove dissolved gases.

Such water is unfit for use in a steam boiler because of scaling. It is common practice to subject the water, after treatment by such methods as gravity separation, flotation and/or filtration to further treatment to soften it. The method of treatment most often used is ion exchange in which the calcium, magnesium and other (e.g., ferric) ions are replaced by sodium ions. This process is expensive because of the cost of the ion exchange material and other factors.

Another method of treatment makes use of chemicals (alkaline) to precipitate hardness followed by ion exchange treatment.

Yet another method of treating produced water is what is known as the Thermosludge process which is described and claimed in Hull U.S. Pat. No. 3,410,796. In that process produced water, after some degree of separation of suspended oil and solids, is supplied to a vessel referred to as a stripper. Chemicals may be introduced into the stream of produced or raw water before it enters the stripper. (The term "raw water" will be used hereinafter to designate water containing dissolved hardness components and dissolved and/or suspended volatile non-aqueous material. The raw water, depending upon its source, may have been given physical separation treatment to separate as much suspended material as is practicable.)

The raw water in the stripper moves downwardly counter-currently to an ascending stream of saturated steam which is generated in a closed system as described below. The patent states that baffles or trays may be used in the stripper and that wipers may be used to scrape sludge from the trays. In actual practice baffles or trays are not used.

The saturated steam, typically at about 450° to 650° F. heats the raw water and causes reactions which are listed in column 4 (lines 70–76) and column 5 (lines 1–3) of the patent. Some of these reactions lead to decomposition of carbonates and the production of carbon dioxide and other reactions result in insoluble carbonates (e.g., calcium carbonate), hydroxides [$Mg(OH)_2$], sulfates (calcium and barium sulfates) and silicates (magnesium silicate). The precipitates together with occluded and/or adsorbed material form what is called a sludge.

A mixture of treated (softened) water and sludge passes into a steam drum where reactions of chemical precipitation are said to be driven to near completion. The steam drum is provided with a blowdown separator through which, typically, about 10–20% of the raw water is removed. This stream (a mixture of softened water and sludge) is then passed through a low pressure separator to separate sludge from softened water which is returned to the raw water supply.

The remainder of the treated water/sludge mixture is caused to pass in a closed system from the steam drum to tubes submerged in a hot mixture of salts such as a eutectic mixture of sodium nitrite and potassium nitrate. Such mixture is kept molten and at the desired temperature by an external source of heat such as an oil fired heater. The treated water/sludge mixture is heated by indirect heat transfer from the molten salt through the walls of the tubes carrying the mixture. The heat thus supplied has the double effect of generating the steam used in the stripper and causing a thermosyphon effect which circulates treated water/sludge mixture from the steam drum to the tubes and back to the steam drum. The mixture of treated water, sludge and steam from the tubes is introduced at an upper part of the steam drum by risers.

A salt mixture is preferred by Hull as the source of heat because of its good heat transfer properties compared to, for example, hot combustion gases in a steam boiler. The good heat transfer property of the molten salt mixture permits one to use a relatively small temperature difference between the salt mixture and the water-steam sludge mixture in the tubes. Such temperature difference is typically about 50° to 200° F. and results in less scale formation than would a higher temperature difference. This contributes to the operability of the Hull/Thermosludge process.

The useful product of this process is steam which passes through the stripper and remains uncondensed. This steam is vented and is used, for example, for injection into an oil field.

In a variant (which, it is believed, is not employed in practice) a larger quantity than 10-20% of treated water/sludge is removed from the steam drum and is caused to pass through a high pressure blow down separator which separates sludge from the treated water. The separated water is then used for oil field injection or for other purposes.

The Hull/Thermosludge process, except for the variant noted above, produces steam as the main product.

The Hull/Thermosludge process has certain major disadvantages despite which it has been and is being used on a large scale for want of a better thermal process (as distinguished from ion exchange and chemical processes). Among these disadvantages are the following:

In the principal embodiment of the Hull invention wherein steam is the useful product, the steam contains all or most of the volatile non-aqueous components such as hydrocarbons and hydrogen sulfide derived from the petroleum, oxygen and carbon dioxide, the latter being generated, in part at least, by the chemical reactions mentioned above. Oxygen, carbon dioxide and hydrogen sulfide are corrosive and create corrosion difficulties.

A major disadvantage is that in spite of the small temperature difference noted above scaling of the tubes in the salt bath does occur and from time to time the system must be shut down, the salt bath cooled and the tubes subjected to thermal shock by cold water to loosen the scale. In addition to shutdown, start up and loss of production resulting from this treatment, it is inefficient and the shock is damaging to the tubes.

This problem (scaling of the tubes in the salt bath) is exacerbated by the presence, which is quite common, of silica. Silica, if (as is not uncommon) it is present in considerable quantity, comes down with other precipitates in the tubes in the salt bath. It is believed that this is an adsorption phenomenon but whether it is a chemical precipitation phenomenon or an adsorption phenomenon, or a mix of the two, it is a fact that scaling does occur in the tubes and is exacerbated by the presence of silica. In the practice of the Hull/Thermosludge process where a silica problem exists, magnesium is added in the form of magnesium chloride to ensure that all or most of the silica is precipitated in the stripper or in the steam drum and not in the tubes in the salt bath. Hull attributes this to his reaction (9):

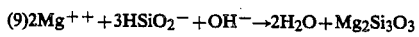

(9) $2Mg^{++} + 3HSiO_2^- + OH^- \rightarrow 2H_2O + Mg_2Si_3O_3$

It may be (and we believe it is) an adsorption phenomenon in which silica is physically adsorbed on magnesium precipitate but whether the action is chemical, physical or a mix of the two, it is a fact that where a silica problem exists magnesium must be added. This represents an added cost and requires monitoring and analysing the produced water. The problem is made more severe by the fact that the hot water injected into an oil bearing formation for secondary recovery (such hot water being injected as such or resulting from condensation of injected steam) dissolves more silica from the formation and brings it to the surface with the recirculated water.

Another disadvantage of this system is that in its principal embodiment the useful product is steam which is generated in the steam chest and all of it passes through (and is partly condensed in) the stripper. If it is desired to use this steam for injection into an oil field, and if the pressure required for injection is very high, the stripper must be of suitable strength to withstand the high steam pressure or else steam of lower pressure vented from the stripper must be subjected to further heating and compression outside the system. Furthermore the stripper must be sized, or multiple strippers must be used in proportion to the demand for injection and augmented recovery.

There are other disadvantages of the Hull/Thermosludge system such as the high cost of heat transfer; a rather lengthy start up time to melt the salt mixture by means of a separate heater; the need to have access to the tubes in the steam chest by draining the salt mixture, etc. Also maximum pressures and temperatures are limited to about 2000 psia and 635° F. because (among other things) increasing pressure decreases the efficiency of the thermosyphon effect and increases scaling, etc.

Despite these disadvantages the Hull/Thermosludge process has found a significant place in the treatment of produced water, because it employs thermal energy to improve the kinetics and efficiency of hardness precipitation rather than chemical or physicochemical methods. In an era when fossil fuel was cheap the fuel costs of this process were relatively minor but for some years fuel costs have been a major factor. Nevertheless, the Hull/Thermosludge system continues in competition with other, non-thermal processes for want of a better thermal process.

It is an object of the present invention to provide a thermal process for such purpose which produces and separates three phases, namely, (1) a gaseous phase (steam) containing volatile non-aqueous material, (2) sludge, and (3) softened water free from dissolved and suspended non-aqueous material including corrosive gases such as oxygen, carbon dioxide and hydrogen sulfide.

It is a further object of the invention to provide a process whereby the silica problem above mentioned is solved and softened water suitable for use in a boiler is produced.

The above and other objects of the invention will be apparent from the ensuing description and the appended claims.

BRIEF DESCRIPTION OF THE DRAWINGS

FIG. 1 is a flow diagram of a system wherein direct injection of steam produced outside the water treatment system is employed to bring about precipitation of salts which cause scaling and also to rid the water of dissolved and suspended non-aqueous material, and the thus treated water, after separation of precipitated solids (sludge) is employed in part to generate the steam required for such precipitation and in part is used to operate steam generators to generate steam for injection into an oil bearing formation or for other purposes requiring high pressure steam. The system may also be used to generate low pressure steam and to produce fresh water;

FIG. 2 is a partial schematic view showing how microwave energy may be used in addition to, or instead of, steam to bring about precipitation reactions in a treatment vessel; and FIG. 3 is a schematic view showing how microwave energy can be used to treat brine produced in an offshore installation and also to produce fresh water.

DESCRIPTION OF THE PREFERRED EMBODIMENTS

The description with reference to FIG. 1 will be with regard to produced water as defined above. It will be understood that any water containing hardness components which are in solution but are precipitable by heat and which also contains volatile non-aqueous material in suspended and/or dissolved form may be treated. Examples of other such sources of water are waste waters from oil refineries, chemical plants and steel mills and residual water from steam cleaning operations such as the cleaning of railroad equipment. The invention is also applicable to the treatment of hard water which may or may not contain dissolved and/or suspended volatile non-aqueous material but which presents the silica problem mentioned above. Ordinarily the water will contain dissolved and/or suspended volatile non-aqueous material and even if the raw water does not it will contain carbon dioxide as the result of the hardness precipitation reaction.

Referring now to FIG. 1, a skim and clarification unit 10 is shown diagrammatically into which saline, e.g., produced water is introduced through line 11. Typical skimming and clarification step or steps are carried out by skimming, flotation, filtration or other means to remove much of the suspended oil and suspended solids. The skimmed oil together with any gases that may be elminated at this point leave through line 12 and suspended solids through line 13.

It will be understood that suitable equipment and procedures of well known design and modes of operation will be employed in this stage of the process, the purpose of which is to rid the influent raw water of most, if not all, of the suspended oil and solids. The thus clarified water is pumped through line 14 by pump 15 to a reaction vessel 16. Steam is generated in the manner described hereinafter and is introduced through line 17 and also, if desired, at a different level through a branch line 18. Chemicals, for example alkali stored in storage vessel 20, may be pumped by pump 25 through line 26 into the reaction vessel 16. For example, alkaline material may be employed to make the liquid phase in the reaction vessel 16 alkaline to assist in the precipitation of solids if the alkalinity of the feed water is insufficient to precipitate all of the hardness in the water. Effluent steam together with other gases such as oxygen, carbon dioxide, hydrogen sulfide and hydrocarbons that may have been dissolved and/or suspended in the influent water together with carbon dioxide generated by the hardness precipitation reactions pass by line 19 into skim and clarification vessel 10. Only enough steam need be used to heat the water in reaction vessel 16 to the required temperature by condensation and to strip the water of gases and suspended oil. The steam passing from vessel 16 is condensed in vessel 10 and is returned to vessel 16. This steam is not a product, or if a product it is not the main product of the process.

Typically the steam entering through lines 17 and 18 is in the range of 350° to 450° F. sufficient to bring the liquid phase in the reaction vessel 16 to a temperature of about 350° to 450° F. and to strip volatile material from the liquid. Higher or lower temperatures may be used but substantially lower temperatures may not bring the precipitation reactions to completion and higher temperatures are unnecessary and wasteful of energy. The flow of gas phase (steam) and liquid phase through reaction vessel 16 may be and preferably is countercurrent.

Under these conditions and during a very short residence time, precipitation of calcium and magnesium salts occurs resulting in a slurry of precipitated solids in softened water. Silica may also precipitate with the magnesium. If (as is often the case) iron is also present in significant quantity, iron salts are also precipitated. As noted above the formation and the amount of silica in the precipitate depend upon the amount of silica and the amount of magnesium in the feed water. As also noted above where the ratio of magnesium to silica is low and the amount of silica is high, in the Hull/Thermosludge process magnesium must be added. In the process of the present invention this is not necessary, for reasons explained below. The slurry is removed through line 27 to a clarification and filtration unit 28 which may employ standard equipment such as centrifuges, cyclone separators, filters, etc. to bring about a complete separation of solids which are removed through line 29 as sludge. The reactions occurring in vessel 16, and the resulting solids are described above or in the Hull patent.

The thus purified and softened water leaves through line 30. This water is the product of major importance of the treatment system and at this point it leaves the system for further utilization such as described below.

This water has absorbed heat from the steam entering at line 17 or lines 17 and 18; the heat is generated outside the system; and the principal function of the steam (other than heating the water) leaving through line 19 is to rid the main product (water in line 30) of corrosive or otherwise objectionable, volatile, non-aqueous material.

A portion of this water is diverted through line 30a by pump 31 to a once through steam generator 32, which generates steam required for the precipitation reactions in reaction vessel 16. If desired a separate source of steam, also generated outside the purification system (e.g., a steam boiler) may be employed for this purpose but it is advantageous to use some of the purified and softened water resulting from the reactions in reaction vessel 16 and the clarification and filtration occurring in unit 28. The water thus treated and clarified and filtered is compatible with a once through steam generator intended to generate steam at the pressure and temperature indicated above. The generator 32 may be fueled by fossil fuel or any other suitable source of thermal energy.

Another part of the clarified and filtered water is pumped by pump 33 through line 34 to a second steam generator 35 and yet another portion is pumped through line 36 to a second steam generator 37. Line 40 indicates a continuation of the diversion of the stream of softened, clarified and filtered water leaving unit 28 which may go to as many additional steam generators as desired. In practice in an oil field where reinjection of produced water is required and where steam injection is practiced, many such steam generators will be required, each generating saturated steam at pressures required for injection. Such pressures vary from about 300 to 2500 psi. As in the case of the steam generator 32, the softened, clarified and filtered water resulting from the reactions in reaction vessel 16 and the treatment in unit 28 is quite compatible with such steam generators. The steam and condensate from steam generator 35 is shown as leaving through line 38 to a separator 39 resulting in saturated steam which leaves through line 40 and in a condensate which leaves through line 45. The condensate constitutes concentrated alkaline brine which may be injected for alkaline thermal oil recovery or passed through a heat exchanger to recover heat and then disposed. The saturated steam may be used for any desired purpose such as injection for oil recovery, power generation, heat recovery and the production of fresh water.

Steam injection for oil recovery usually involves injection of wet steam of about 80% quality. Such steam is generated by steam generator 37 and leaves through line 46. Similar steam outlets will be provided for further steam generators. It is this wet steam which may be injected into an oil field as described above.

Further, part or all of the treated water may leave the purification system through line 47 for injection into an oil field for thermal recovery of heavy viscous oil.

Referring now to FIG. 2, the reaction vessel 16 is there shown together with a fragment of input line 14 (for clarified but unsoftened water) and 26 (for introduction of chemicals). Outlet 27 for the efflux of treated water containing suspended, precipitated solids and line 19 for return of steam to skim and clarification unit 10 (see FIG. 1) are shown. Also shown are wave guides 50 and windows 51. Two such wave guides and windows are shown but there may be more distributed about the reaction vessel 16. The wave guides are of a type suitable for guiding and conducting microwave energy and the windows 51 are of a material which is transparent to microwave energy and has sufficient strength to withstand the pressure generated in teh vessel 16.

For the purpose of generating microwave energy any of several known types of generator may be used, including klystron types and magnetron types of microwave generator capable of generating microwave energy at the desired frequency or range of frequencies and at the power level desired. It is a property of microwave energy that it interacts selectively with water molecules to generate thermal energy which results in heating the water. The microwave energy may have a frequency of 900 or lower to 1020 or higher and will be selected to have an optimum heating effect.

Treated water and suspended solids leave the reaction vessel 16 through line 27 and are treated as in FIG. 1. The purified water is then used as in FIG. 1 to generate steam.

In FIG. 2 the microwave energy is indicated as the sole source of energy input but it may be used to augment the use of steam as in FIG. 1 or steam may be used to augment the use of microwave energy. If steam is employed as part of the heat input to reaction vessel 16, it may be generated in steam generator 32 as in FIG. 1. The microwave energy may have any desired frequency, e.g., 915 to 2450 megacycles, which is convenient and which couples to water to cause the necessary heating and evaporation.

Referring now to FIG. 3 an installation suited for use on or in proximity to an offshore drilling rig is shown. It is assumed that the same problem or a similar problem exists as described above in connection with FIG. 1, namely the production of brine along with oil. In an offshore installation it is undesirable to employ a boiler fueled with fossil fuel because of the fire hazard, yet it is difficult to convey steam generated at a remote location to the drilling rig.

In the embodiment of FIG. 3, microwave energy is employed as the heating medium. Such energy may be generated from electricity which in turn is commonly generated on or near such installation. Brine separated from oil and suspended solids as in FIG. 1 enters reaction vessel 16 through line 14 together with needed chemicals (if any) through line 17 as in FIG. 1. Microwave energy is introduced at 50 (as in FIG. 2) sufficient to bring about chemical reactions as described above and the precipitation of calcium and/or magnesium salts together with iron salts if iron is present and also silica if it is present together with magnesium as described above. Steam together with gases stripped from the water leave through line 19 to return to other units as in FIG. 1 or they may be vented to the atmosphere.

A slurry leaves reaction vessel 16 through line 52 and enters vessel 16A where it is heated by microwave energy introduced at 50A. Low pressure steam is generated in vessel 16A and leaves through line 53 to be condensed to supply fresh (distilled) water for use on the offshore installation. The liquid phase in vessel 16A is concentrated to the degree needed for such use and precipitation of dissolved solids by reason of such removal of water. This results in a slurry of concentrated brine and solids which is removed through line 54 and discarded.

To carry out this process continuously the vessel 16A will be designed so that as slurry proceeds through it, the slurry is continuously and increasingly concentrated.

This embodiment of the invention has the advantages of precipitating solids by chemical reaction and producing fresh water and of avoiding the need for a boiler fired by fossil fuel.

It will be understood that the water introduced into unit 10 and treated as described herein above may constitute all of the water produced from an oil field or it may constitute only enough of the produced water to generate steam for steam injection, the remainder being otherwise disposed of, e.g., reinjected without treatment into the field.

Among the advantages of our process as applied in FIG. 1 are the following: The temperature employed and the pressure prevailing in the reaction vessel 16 are independent of the steam pressures and temperatures generated in steam generators 35, 37, etc., which may be conventional steam generators employing a steam chest, a coil within the chest and fossil fuel as the source of heat to generate the steam. If desired eutectic mixtures of solids may be employed as in U.S. Pat. No. 3,410,796 but preferably other heating means are employed because they are cheaper to install and less expensive and complicated to operate.

There is little or no scaling problem because the softened water is free of sludge before it is put through a steam boiler. Nor is there a significant silica problem. If the quantity of silica and the magnesium/silica ratio are such that not all of the silica is brought down in reactor 16, the silica which remains dissolved in the softened water is compatible with a once through steam boiler. In the absence of precipitable magnesium the solubility of silica increases with temperature and alkalinity, hence it does not form scale on boiler tubes. (It is not contended that all problems such as scaling are completely eliminated, but such problems are greatly diminished or are of little significance.)

The treated water leaving through line 30 is suitable for direct feed to conventional once through steam generators. The use of the higher cost heat transfer system of Hull is not required. Shutdowns are infrequent and difficulties such as melting a salt mixture during start up and shutdowns for thermal shocking/descaling are avoided. Since combustion gases at a high temperature, e.g., 1600° F. and higher, are employed in the steam generators 32, 35, 37, etc., there is no need to use a salt mixture having the advantage of good heat conductivity. In a conventional once through steam generator a fuel such as oil or natural gas is burned and the tubes are heated by radiation from the burner and by contact with the hot combustion gases. The temeperatures are high which compensates for the relatively poor heat transfer (as compared to hull's molten salt mixture). The softened water, freed of sludge and volatile non-aqueous material as in the present invention is compatible with these high temperatures. The water-sludge mixture of Hall is not compatible with these high temperatures.

The production of high pressure steam for injection into oil bearing formations has been emphasized but the system of the invention is applicable to the production of low pressure steam to produce fresh water. In that case steam generators 35, 37, etc. would operate at low pressures and temperatures and the low pressure steam could be used as such and/or to produce fresh water with recovery of heat and rejection of concentrated brine or its use to produce minerals. As noted above in connection with FIG. 3, in an offshore installation it may be unnecessary to generate high pressure steam.

It will therefore be apparent that a new and advantageous system of treating hard water containing also dissolved and/or suspended volatile non-aqueous material has been provided.

What is claimed is:

1. A method of treating hard water produced with petroleum from an oil well or oil wells which comprises, after separation of the hard water from the bulk of the oil, the following steps
   (a) introducing the separated, hard water into a reaction zone;
   (b) generating steam in a steam boiler from a separate supply of soft water;
   (c) introducing such steam directly into the hard water in such reaction zone in quantity and at a temperature and pressure sufficient to heat the hard water to the range of about 350° to 450° F. and to precipitate the hardness in the form of sludge, the quantity of steam so introduced being insufficient to evaporate more than a small amount of the hard water introduced into the reaction zone in step (a), thereby resulting in softened water as the principal product of step (c) and also producing sludge;
   (d) venting steam from the reaction zone together with non-aqueous volatile substances including carbon dioxide dissolved in the hard water introduced into the reaction zone and/or resulting from thermal decomposition of carbonates and/or bicarbonates in the reaction zone, together with such volatile hydrocarbon constituents of the hard water as may be introduced into the reaction zone;
   (e) separating sludge formed in step (c) from softened water produced in step (c), and
   (f) withdrawing from the system softened water as the major product.

2. The method of claim 1 in which at least a portion of the softened water withdrawn in step (f) is injected as hot water or as steam into the formation in which said oil well or wells have been drilled.

3. The method of claim 1 wherein a portion of the softened water withdrawn in step (f) is supplied to a steam boiler to provide the steam used in step (c).

4. The method of claim 3 in which at least a portion of the softened water withdrawn in step (f) is injected as hot water or as steam into the formation in which said oil well or wells have been drilled.

5. The method of claim 4 in which the oil produced from such formation is a heavy oil and the softened water or steam injected into the formation results in enhanced recovery of oil.

6. The method of any of claims 1 to 5 in which the hard water has an alkalinity insufficient to precipitate all of the hardness in the water, wherein alkaline material is added to the hard water to increase precipitation of hardness.

* * * * *